United States Patent
Sun et al.

(10) Patent No.: US 10,545,286 B2
(45) Date of Patent: Jan. 28, 2020

(54) HOUSING FOR PACKAGING OPTICAL TRANSMITTER MODULE AND OPTICAL TRANSMITTER MODULE

(71) Applicant: Huawei Technologies Co., Ltd., Shenzhen (CN)

(72) Inventors: Min Sun, Shenzhen (CN); Wenjie Zhuang, Shenzhen (CN); Liping Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/020,366

(22) Filed: Jun. 27, 2018

(65) Prior Publication Data

US 2018/0306973 A1 Oct. 25, 2018

Related U.S. Application Data (63) Continuation of application No. PCT/CN2016/112429, filed on Dec. 27, 2016.

(30) Foreign Application Priority Data

Dec. 28, 2015 (CN) .......................... 2015 1 1004829

(51) Int. Cl.
*G02B 6/12* (2006.01)
*G02B 6/42* (2006.01)

(52) U.S. Cl.
CPC ....... *G02B 6/12007* (2013.01); *G02B 6/4214* (2013.01)

(58) Field of Classification Search
None
See application file for complete search history.

(56) References Cited

U.S. PATENT DOCUMENTS

| 6,116,791 A | 9/2000 | Laninga et al. |
| 2002/0048431 A1 | 4/2002 | Kimura |

(Continued)

FOREIGN PATENT DOCUMENTS

| CN | 1469144 A | 1/2004 |
| CN | 203260630 U | 10/2013 |

(Continued)

OTHER PUBLICATIONS

Foreign Communication From a Counterpart Application, European Application No. 16881181.8, Extended European Search Report dated Oct. 25, 2018, 6 pages.

(Continued)

*Primary Examiner* — David W Lambert
(74) *Attorney, Agent, or Firm* — Conley Rose, P.C.

(57) ABSTRACT

A housing for packaging an optical transmitter module includes a body, a focusing structure, a first three-dimensional (3D) optical waveguide, and an optical fiber interface. The optical fiber interface is located inside the body and configured to accommodate a single-mode optical fiber. The first 3D optical waveguide is embedded in the body. The focusing structure is configured to receive a first single-mode optical signal and enable the received first single-mode optical signal to be focused for a first time at a focal point of the focusing structure. The first 3D optical waveguide is configured to receive the first single-mode optical signal, and output the first single-mode optical signal to the single-mode optical fiber. The focal point of the focusing structure coincides with an input end of the first 3D optical waveguide.

20 Claims, 4 Drawing Sheets

(56) References Cited

U.S. PATENT DOCUMENTS

| | | | |
|---|---|---|---|
| 2003/0017640 A1 | 1/2003 | Foley Barenburg et al. | |
| 2003/0095311 A1* | 5/2003 | Liu | H04J 14/08 |
| | | | 398/98 |
| 2004/0114881 A1 | 6/2004 | Wilson | |
| 2004/0234205 A1 | 11/2004 | Shimada et al. | |
| 2005/0058399 A1* | 3/2005 | Nishizawa | G02B 6/4214 |
| | | | 385/39 |
| 2005/0123241 A1 | 6/2005 | Margalit et al. | |
| 2007/0116475 A1* | 5/2007 | McBrien | G02F 1/0356 |
| | | | 398/164 |
| 2007/0292081 A1 | 12/2007 | Hashimoto et al. | |
| 2010/0178006 A1 | 7/2010 | Nishimura et al. | |
| 2011/0097037 A1 | 4/2011 | Kuznia et al. | |
| 2013/0230280 A1 | 9/2013 | Kadar-Kallen | |
| 2013/0294721 A1 | 11/2013 | Lee | |
| 2014/0133802 A1* | 5/2014 | Morioka | G02B 6/4286 |
| | | | 385/33 |
| 2014/0136650 A1 | 5/2014 | Keskitalo et al. | |
| 2015/0078712 A1* | 3/2015 | Brunner | B29D 11/00663 |
| | | | 385/92 |
| 2016/0091665 A1* | 3/2016 | Jones | H04Q 11/0005 |
| | | | 385/2 |

FOREIGN PATENT DOCUMENTS

| | | | |
|---|---|---|---|
| CN | 103703399 A | | 4/2014 |
| CN | 103901561 A | | 7/2014 |
| CN | 104220915 A | | 12/2014 |
| CN | 105445870 A | | 3/2016 |
| JP | 05281443 A | * | 10/1993 |
| JP | H05281443 A | | 10/1993 |
| JP | 2004191989 A | | 7/2004 |
| JP | 2011145494 A | | 7/2011 |
| WO | 2014108539 A1 | | 7/2014 |
| WO | 2017053073 A1 | | 3/2017 |

OTHER PUBLICATIONS

Machine Translation and Abstract of Chinese Publication No. CN103901561, dated Jul. 2, 2014, 8 pages.
Machine Translation and Abstract of Chinese Publication No. CN105445870, dated Mar. 30, 2016, 19 pages.
Machine Translation and Abstract of Chinese Publication No. CN203260630, dated Oct. 30, 2013, 3 pages.
Machine Translation and Abstract of Japanese Publication No. JP2011145494, dated Jul. 28, 2011, 15 pages.
Machine Translation and Abstract of Japanese Publication No. JPH05281443, dated Oct. 29, 1993, 12 pages.
Foreign Communication From a Counterpart Application, Chinese Application No. 201511004829.X, Chinese Office Action dated Nov. 28, 2016, 5 pages.
Foreign Communication From a Counterpart Application, Chinese Application No. 201511004829.X, Chinese Search Report dated Nov. 15, 2016, 2 pages.
Foreign Communication From a Counterpart Application, PCT Application No. PCT/CN2016/112429, English Translation of International Search Report dated Apr. 1, 2017, 2 pages.
Foreign Communication From a Counterpart Application, PCT Application No. PCT/CN2016/112429, English Translation of Written Opinion dated Feb. 1, 2017, 8 pages.

* cited by examiner

HOUSING FOR PACKAGING OPTICAL TRANSMITTER MODULE AND OPTICAL TRANSMITTER MODULE

CROSS-REFERENCE TO RELATED APPLICATIONS

This application is a continuation application of international patent application number PCT/CN2016/112429 filed on Dec. 27, 2016, which claims priority to Chinese patent application number 201511004829.X filed on Dec. 28, 2015. The disclosures of the aforementioned applications are hereby incorporated by reference in their entireties.

TECHNICAL FIELD

The present disclosure relates to the field of optical communications technologies, and in particular, to a housing for packaging an optical transmitter module and an optical transmitter module.

BACKGROUND

A multi-mode optical fiber is used to transmit optical waves in a plurality of modes at a same time. Because optical waves in different modes interfere with each other, high inter-mode dispersion is caused, and a relatively small capacity of information can be transmitted, the multi-mode optical fiber is usually used in a small-capacity and short-distance optical signal transmission system. A single-mode optical fiber can transmit an optical wave in only one mode. Because the optical wave in only one mode is transmitted, there is no problem of inter-mode dispersion in the single-mode optical fiber. Therefore, the single-mode optical fiber is used in a large-capacity and long-distance optical signal transmission system.

A fiber core of the multi-mode optical fiber is relatively large, and is usually 50 micrometers (um). However, a core diameter of a single-mode optical fiber is small, and is usually 9 µm or 10 µm. A housing for packaging an optical transmitter module provided in other approaches is adapted to the multi-mode optical fiber. It becomes particularly important to design, based on a great advantage of the single-mode optical fiber over the multi-mode optical fiber in terms of optical signal transmission, a housing that is for packaging an optical transmitter module and that can be adapted to the single-mode optical fiber.

SUMMARY

An objective of the present disclosure is to provide a housing that is for packaging an optical transmitter module and that is to be adapted to a single-mode optical fiber for single-mode optical signal transmission, and an optical transmitter module that can transmit a single-mode optical signal.

According to a first aspect, an embodiment of the present disclosure provides a housing for packaging an optical transmitter module, where the housing includes a body, a focusing structure, a first three-dimensional (3D) optical waveguide, and an optical fiber interface, the optical fiber interface is located inside the body and configured to accommodate a single-mode optical fiber, and the first 3D optical waveguide is embedded in the body, and the focusing structure is configured to receive a first single-mode optical signal transmitted by a single-mode laser, and enable the received first single-mode optical signal to be focused for a first time at a focal point of the focusing structure, and the first 3D optical waveguide is configured to receive, from an input end of the first 3D optical waveguide, the first single-mode optical signal that has been focused for the first time, and output, from an output end of the first 3D optical waveguide, the first single-mode optical signal that has been focused for the first time to the single-mode optical fiber, where the focal point of the focusing structure coincides with the input end of the first 3D optical waveguide. In this embodiment, the first 3D optical waveguide is applied to the housing for packaging an optical transmitter module, the housing for packaging an optical transmitter module is provided, and the housing can be adapted to the single-mode optical fiber for single-mode optical signal transmission.

With reference to the first aspect, in a first possible implementation, a bending radius of the first 3D optical waveguide is greater than or equal to 500 µm.

With reference to the first aspect or the first possible implementation, in a second possible implementation, the first single-mode optical signal is transmitted from a bottom surface of the body to the focal point of the focusing structure, and an optical path of the transmission is greater than or equal to 900 µm.

With reference to the first aspect, the first possible implementation, or the second possible implementation, in a third possible implementation, the focusing structure is a first lens in a hemispherical shape, the focal point of the focusing structure is a focal point of the first lens, hemispherical surface of the first lens is exposed at an outer side of a bottom of the body, the other surface of the first lens faces an inner side of the body, and a position fit relationship between the first lens and the single-mode laser enables a center of a light-emitting surface of the single-mode laser to be in a straight line of an optical axis of the first lens. Because the first lens has favorable focusing performance, if the first lens is used for focusing, an optical signal passing through the first lens has a relatively low loss and is relatively rapidly focused. Therefore, in this embodiment of the present disclosure, use of the first lens to focus the first single-mode optical signal can reduce a loss of the first single-mode optical signal passing through the first lens, and enable the first single-mode optical signal to be focused after only a short transmission distance after passing through the first lens.

With reference to the first aspect, the first possible implementation, or the second possible implementation, in a fourth possible implementation, the focusing structure includes a first lens in a hemispherical shape and a first reflective surface, a hemispherical surface of the first lens is exposed at an outer side of a bottom of the body, and the other surface of the first lens faces an inner side of the body, a position fit relationship between the first lens and the single-mode laser enables a center of a light-emitting surface of the single-mode laser to be in a straight line of an optical axis of the first lens, and the first reflective surface is located inside the body, the first lens is configured to receive the first single-mode optical signal transmitted by the single-mode laser, and transmit the received first single-mode optical signal to the first reflective surface, and the first reflective surface is configured to reflect the first single-mode optical signal transmitted by the first lens, and enable the reflected first single-mode optical signal to be focused for the first time at the focal point of the focusing structure, where the focal point of the focusing structure is a symmetry point of a focal point of the first lens about the first reflective surface.

It should be noted that a reflective surface has a function of changing a light propagation direction. In this embodiment of the present disclosure, the first reflective surface is configured to change a propagation direction of the first single-mode optical signal transmitted from the first lens. If the bending radius of the first 3D optical waveguide is limited by a material and a structure of the first 3D optical waveguide, use of the first reflective surface helps to implement miniaturization of the housing.

With reference to the fourth possible implementation, in a fifth possible implementation, from the input end of the first 3D optical waveguide to the output end of the first 3D optical waveguide, the first 3D optical waveguide extends in a straight line direction, and an input end of the single-mode optical fiber is located in an extension direction of the first 3D optical waveguide.

With reference to any one of the first aspect or the first possible implementation or the fourth possible implementation, in a sixth possible implementation, the first 3D optical waveguide includes an input portion and a transmission portion, an input end of the input portion is the input end of the first 3D optical waveguide, and an output end of the transmission portion is the output end of the first 3D optical waveguide, the input portion is configured to receive, from the input end of the input portion, the first single-mode optical signal that has been focused for the first time, and transmit the first single-mode optical signal that has been focused for the first time to the transmission portion, the transmission portion is configured to receive the first single-mode optical signal that has been focused for the first time, and output, from the output end of the transmission portion, the first single-mode optical signal that has been focused for the first time to the single-mode optical fiber, and a diameter of the input portion decreases evenly in a transmission direction of an optical signal in the input portion, and a minimum diameter of the input portion is the same as a diameter of the transmission portion.

It can be learned from the foregoing descriptions that in the entire first 3D optical waveguide, a diameter of the input end of the input portion is the largest, and the first single-mode optical signal that has been focused for the first time enters the input portion from the input end to the input portion. The diameter of the input end of the input portion is set relatively large, helping the first single-mode optical signal that has been focused for the first time enter the input portion relatively easily, and causing the first single-mode optical signal that enters the input portion to have a smaller loss than the first single-mode optical signal that has been focused for the first time. Therefore, the diameter of the input end of the input portion is set greater than the diameter of the transmission portion, and this helps to improve tolerance performance of the housing for an optical transmitter module.

With reference to the sixth possible implementation, in a seventh possible implementation, a length of the input portion is greater than or equal to 50 µm, a diameter of the input end of the input portion falls within an interval [9 µm, 50 µm], and the minimum diameter of the input portion and the diameter of the transmission portion fall within an interval [200 nm, 10 µm].

With reference to the sixth possible implementation, in an eighth possible implementation, a diameter of the input end of the input portion falls within an interval [9 µm, 20 µm], and the minimum diameter of the input portion and the diameter of the transmission portion fall within an interval [3 nanometers (nm), 9 µm].

With reference to any one of the sixth possible implementation to the eighth possible implementation, in a ninth possible implementation, the input portion and the transmission portion are integrally formed.

With reference to any one of the sixth possible implementation to the eighth possible implementation, in a tenth possible implementation, the input portion and the transmission portion are two independent 3D optical subwaveguides, the input portion is a first subwaveguide, the transmission portion is a second subwaveguide, and an output end of the first subwaveguide is connected to an input end of the second subwaveguide.

With reference to any one of the sixth possible implementation to the eighth possible implementation, in an eleventh possible implementation, if the input portion and the transmission portion are two independent subwaveguides, the input portion is a first subwaveguide, and the transmission portion is a second subwaveguide, the housing further includes a second reflective surface, where the second reflective surface is located inside the body, and an output end of the first subwaveguide and an input end of the second subwaveguide are both in contact with the second reflective surface, and the second reflective surface is configured to receive the first single-mode optical signal that has been focused for the first time and that is transmitted by the first subwaveguide, and transmit the first single-mode optical signal that has been focused for the first time to the second subwaveguide.

It is easily learned that a reflective surface can change a light transmission direction, and if the input portion and the transmission portion are two independent subwaveguides, and the second reflective surface is added to the inside of the housing, a transmission direction of the first single-mode optical signal that has been focused for the first time and that is output from the first subwaveguide is changed to implement transmission of the first single-mode optical signal that has been focused for the first time to the second subwaveguide, avoiding disadvantages of requiring a relatively long 3D optical waveguide and occupying of relatively large space by the relatively long 3D optical waveguide when a transmission direction of a single-mode optical signal needs to be changed using a bending 3D optical waveguide, thereby helping to implement miniaturization of the housing for packaging an optical transmitter module.

With reference to any one of the third possible implementation to the eleventh possible implementation, in a twelfth possible implementation, a diameter of the first lens falls within an interval [130 µm, 3 millimeters (mm)], and a minimum distance between the hemispherical surface of the first lens and the light-emitting surface of the single-mode laser is greater than or equal to 10 µm.

With reference to the twelfth possible implementation, in a thirteenth possible implementation, a distance between the focal point of the first lens and the bottom surface of the body is greater than or equal to 900 µm.

With reference to any one of the first aspect or the first possible implementation to the thirteenth possible implementation, in a fourteenth possible implementation, if the output end of the first 3D optical waveguide and an input end of the single-mode optical fiber are separate from each other, the housing further includes a second lens, where the second lens is located between the output end of the first 3D optical waveguide and the input end of the single-mode optical fiber, and the second lens is configured to receive the first single-mode optical signal that has been focused for the first time and that is output from the output end of the first 3D optical waveguide, enable the first single-mode optical signal that has been focused for the first time to be focused for a second time at a focal point of the second lens, and output the first single-mode optical signal that has been focuses for the second time to the single-mode optical fiber, where the focal point of the second lens coincides with the input end of the single-mode optical fiber.

If the output end of the first 3D optical waveguide and the input end of the single-mode optical fiber are separate from each other, and there is no second lens, after the first single-mode optical signal that has been focused for the first time is output from the output end of the first 3D optical waveguide, serious divergence occurs in transmission in a medium between the output end of the first 3D optical waveguide and the input end of the single-mode optical fiber. Consequently, only a small part of the first single-mode optical signal that has been focused for the first time can enter the input end of the single-mode optical fiber. In this embodiment of the present disclosure, the second lens is used to focus the first single-mode optical signal that has been focused for the first time for the second time, and the focal point at which the focusing is performed for the second time coincides with the input end of the single-mode optical fiber such that a loss caused when the first single-mode optical signal that has been focused for the first time enters the input end of the single-mode optical fiber from the output end of the first 3D optical waveguide can be reduced.

With reference to any one of the first aspect or the first possible implementation to the thirteenth possible implementation, in a fifteenth possible implementation, if a diameter of the output end of the first 3D optical waveguide is less than or equal to a diameter of an input end of the single-mode optical fiber, the output end of the first 3D optical waveguide is connected to the input end of the single-mode optical fiber. An effect of this embodiment of the present disclosure is as follows. The first single-mode optical signal that has been focused for the first time is transmitted from the output end of the first 3D optical waveguide to the input end of the single-mode optical fiber without passing through any other medium, thereby reducing a loss caused during the transmission of the first single-mode optical signal that has been focused for the first time from the output end of the first 3D optical waveguide to the input end of the single-mode optical fiber.

With reference to any one of the first aspect or the first possible implementation to the fifteenth possible implementation, in a sixteenth possible implementation, the housing further includes a second 3D optical waveguide, where the second 3D optical waveguide is located inside the body, and the second 3D optical waveguide is configured to couple, through evanescent wave coupling, a second single-mode optical signal from the first single-mode optical signal that has been focused for the first time and that is transmitted in the first 3D optical waveguide, to perform backlight detection using the second single-mode optical signal, where the second single-mode optical signal is a part of the first single-mode optical signal.

In this embodiment of the present disclosure, the second single-mode optical signal is coupled using the second 3D optical waveguide and an evanescent wave coupling principle. Compared with the other approaches, an effect of this embodiment of the present disclosure is to provide a solution of light splitting in a single-mode optical signal. The solution is used in the housing for packaging an optical transmitter module to perform backlight detection.

With reference to the sixteenth possible implementation, in a seventeenth possible implementation, the second 3D optical waveguide includes an optical coupling portion and an optical transmission portion, where the optical coupling portion is parallel to a coupled waveguide segment of the first 3D optical waveguide, and an output end of the optical transmission portion is perpendicular to the bottom surface of the body, the optical coupling portion is configured to couple, through evanescent wave coupling, the second single-mode optical signal from the coupled waveguide segment, and transmit the second single-mode optical signal to the optical transmission portion, and the optical transmission portion is configured to transmit the second single-mode optical signal to outside of the housing, to perform backlight detection using the second single-mode optical signal.

With reference to the seventeenth possible implementation, in an eighteenth possible implementation, a spacing between the optical coupling portion and the coupled waveguide segment is greater than or equal to 50 nm and less than or equal to 3 μm.

According to a second aspect, an embodiment of the present disclosure further provides an optical transmitter module, including a substrate, a single-mode laser, a single-mode optical fiber, and the housing according to any one of the first aspect or the first to the eighteenth possible implementations of the first aspect. The single-mode laser and the housing are both fixed to an upper surface of the substrate, the single-mode laser is located in a cavity enclosed by the housing and the upper surface of the substrate, and the single-mode optical fiber is accommodated in an optical fiber interface located inside the housing, and the single-mode laser is configured to transmit a first single-mode optical signal to a hemispherical surface of the first lens, and the housing is configured to receive the first single-mode optical signal, and output the received first single-mode optical signal to the single-mode optical fiber.

The embodiments of the present disclosure provide the optical transmitter module. The optical transmitter module includes the single-mode laser, the housing that can be adapted to the single-mode optical fiber for single-mode optical signal transmission, and the single-mode optical fiber. The optical transmitter module can transmit a single-mode optical signal to be transmitted in the single-mode optical fiber.

DESCRIPTION OF EMBODIMENTS

Figure 1:
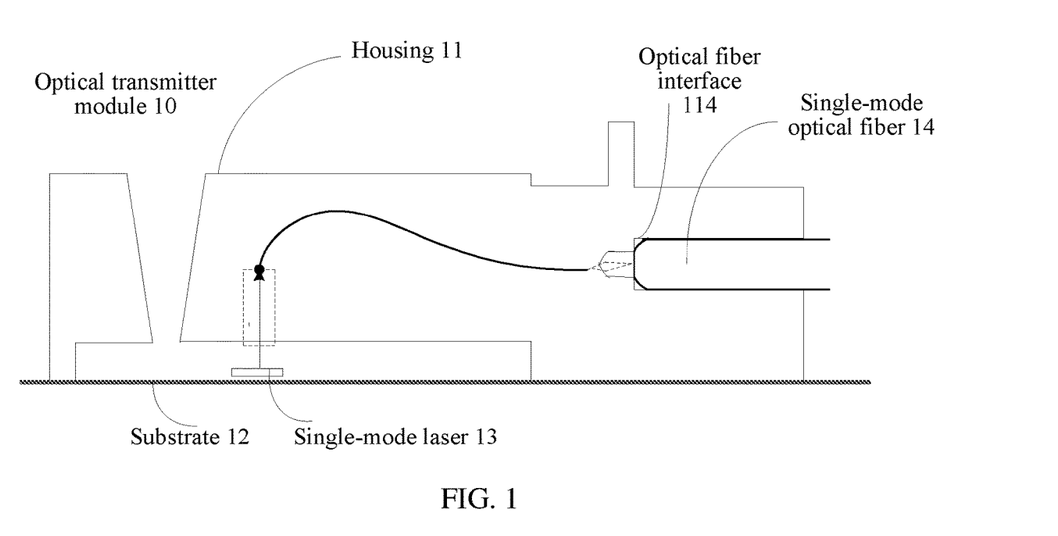
FIG. 1 is a schematic structural diagram of an optical transmitter module according to an embodiment of the present disclosure.

Referring to FIG. 1, FIG. 1 is a schematic structural diagram of an optical transmitter module 10 according to an embodiment of the present disclosure. The optical transmitter module 10 is used in the field of optical communications technologies, and is configured to transmit a single-mode optical signal. Further, the optical transmitter module 10 includes a housing 11, a substrate 12, a single-mode laser 13, and a single-mode optical fiber 14. The single-mode laser 13 and the housing 11 are both fixed to an upper surface of the substrate 12. The single-mode laser 13 is located in a cavity enclosed by the housing 11 and the upper surface of the substrate 12. The single-mode optical fiber 14 is accommodated in an optical fiber interface 114 located inside the housing 11.

The single-mode laser 13 is configured to transmit a first single-mode optical signal. The housing 11 is configured to receive the first single-mode optical signal transmitted by the single-mode laser 13, and output the received first single-mode optical signal to the single-mode optical fiber 14.

It should be noted that the optical fiber interface 114 is physical space. Further, the optical fiber interface 114 is a groove-shaped accommodating portion formed in a body and configured to accommodate the single-mode optical fiber 14. The single-mode optical fiber 14 is inserted from an opening of the groove. After the insertion, an inserted end of the single-mode optical fiber 14 is in contact with a bottom of the groove. Certainly, a depth of the groove is a length of the single-mode optical fiber 14 inserted into the groove.

It should be noted that a bottom surface of the housing 11 is adhered to the upper surface of the substrate 12 using a glue (such as an ultraviolet curable adhesive) to fix the housing 11 to the upper surface of the substrate 12. The bottom surface of the housing 11 is opposite to the upper surface of the substrate 12. The glue herein is used to fix the housing 11 to the upper surface of the substrate 12 on the one hand, and on the other hand, the glue is used for sealing.

It should be noted that the housing 11 may be made of a glass substrate material having light transmittance property, such as silica, or a polymer material having light transmittance property, such as polyetherimide ultem.

In a specific example of the optical transmitter module 10 provided in this embodiment of the present disclosure, the substrate 12 may be a printed circuit board.

It should be noted that a size of the optical transmitter module 10 provided in this embodiment of the present disclosure may be limited by a Multi-Source Agreement (MSA) to increase commonality of the optical transmitter module 10.

Compared with an optical transmitter module provided in the other approaches, the optical transmitter module 10 provided in this embodiment of the present disclosure can transmit a single-mode optical signal to be transmitted in a single-mode optical fiber, and transmit the single-mode optical signal to the single-mode optical fiber. Based on a feature of being suitable for long-distance transmission of the single-mode optical signal, the optical transmitter module 10 provided in this embodiment of the present disclosure can be used in an optical communications system for long-distance optical signal transmission.

Figure 2A:
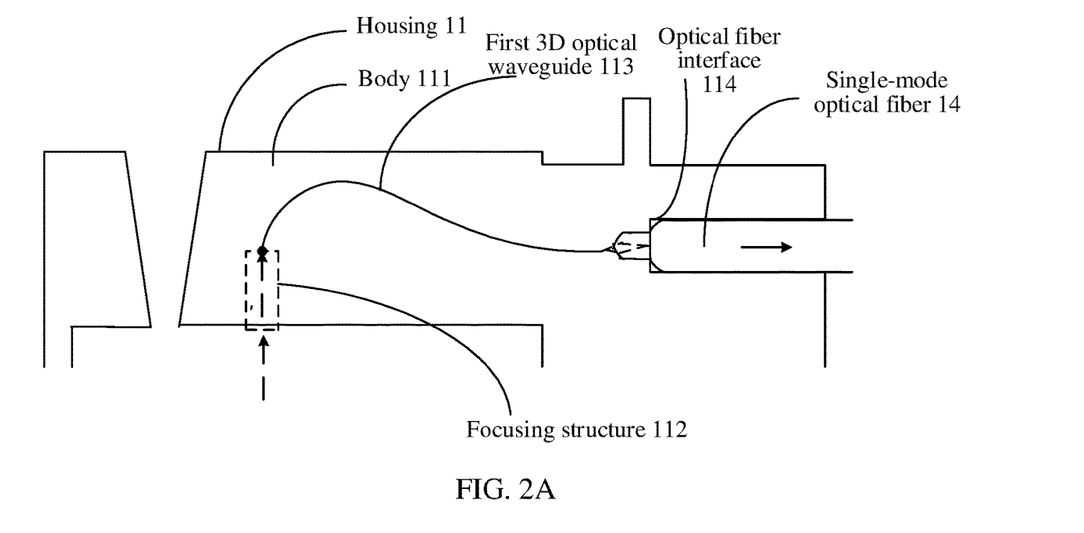
FIG. 2A is a schematic structural diagram of a housing for packaging an optical transmitter module according to an embodiment of the present disclosure.

Referring to FIG. 2A, FIG. 2A is a schematic structural diagram of a housing 11 for packaging an optical transmitter module according to an embodiment of the present disclosure. The housing 11 may be applied to the embodiment of the optical transmitter module 10 shown in FIG. 1 such that the optical transmitter module 10 can transmit a single-mode optical signal. As shown in FIG. 2A, the housing 11 includes a body 111, a focusing structure 112, a first 3D optical waveguide 113, and an optical fiber interface 114. The optical fiber interface 114 is located inside the body 111 and configured to accommodate a single-mode optical fiber 14. The first 3D optical waveguide 113 is embedded in the body 111.

The focusing structure 112 is configured to receive a first single-mode optical signal transmitted by a single-mode laser (for each single-mode laser described in this embodiment, refer to the single-mode laser 13 in FIG. 1, and details are not described again below), and enable the received first single-mode optical signal to be focused for a first time at a focal point of the focusing structure 112, and the first 3D optical waveguide 113 is configured to receive, from an input end of the first 3D optical waveguide 113, the first single-mode optical signal that has been focused for the first time, and output, from an output end of the first 3D optical waveguide 113, the first single-mode optical signal that has been focused for the first time to the single-mode optical fiber 14, where the focal point of the focusing structure 112 coincides with the input end of the first 3D optical waveguide 113.

It should be noted that a bending radius of the first 3D optical waveguide 113 is greater than or equal to 500 µm.

It should be noted that the first single-mode optical signal is transmitted from a bottom surface of the body 111 to the focal point of the focusing structure 112, and an optical path of the transmission is greater than or equal to 900 µm.

In this embodiment of the present disclosure, a diameter of the first 3D optical waveguide 113 falls within an interval from 200 nm to 10 µm. The diameter of the first 3D optical waveguide 113 may be an endpoint value of the interval, that is, the diameter of the first 3D optical waveguide 113 may be 200 nm or 10 µm. The first 3D optical waveguide 113 is made of a material having light transmittance property, such as silicon, silica, or a polymer material.

It can be learned from the foregoing descriptions that in this embodiment, the first 3D optical waveguide 113 is applied to the housing 11 for packaging an optical transmitter module, the housing 11 for packaging an optical transmitter module is provided, and the housing 11 can be adapted to the single-mode optical fiber 14 for single-mode optical signal transmission.

It should be noted that in the housing 11 provided in this embodiment of the present disclosure, a second lens 115 may be disposed between the output end of the first 3D optical waveguide 113 and an input end of the single-mode optical fiber 14 (referring to FIG. 2B), or the output end of the first 3D optical waveguide 113 and an input end of the single-mode optical fiber 14 may be directly connected (referring to FIG. 2C), that is an end surface of the output end of the first 3D optical waveguide 113 is in contact with an end surface of the input end of the single-mode optical fiber 14.

Figure 2B:
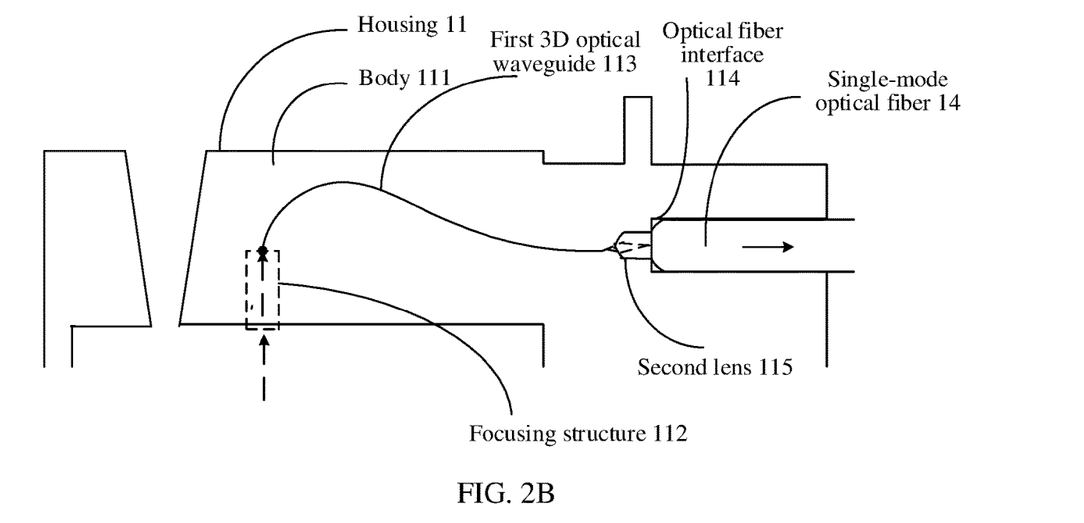
FIG. 2B is a schematic structural diagram of another housing for packaging an optical transmitter module according to an embodiment of the present disclosure.

FIG. 2B provides another embodiment of the housing 11. Different from the embodiment of the housing 11 shown in FIG. 2A, in the embodiment of the housing 11 shown in FIG. 2B, the output end of the first 3D optical waveguide 113 and an input end of the single-mode optical fiber 14 are separate from each other, and the housing 11 further includes the second lens 115, where the second lens 115 is located between the output end of the first 3D optical waveguide 113 and the input end of the single-mode optical fiber 14. The second lens 115 is configured to receive the first single-mode optical signal that has been focused for the first time and that is output from the first 3D optical waveguide 113, enable the first single-mode optical signal that has been focused for the first time to be focused for a second time at a focal point of the second lens 115, and output the first single-mode optical signal that has been focused for the second time to the single-mode optical fiber 14. The focal point of the second lens 115 coincides with the input end of the single-mode optical fiber 14.

It should be noted that, that the output end of the first 3D optical waveguide 113 and the input end of the single-mode optical fiber 14 are separate from each other means that the output end of the first 3D optical waveguide 113 is not in contact with the input end of the single-mode optical fiber 14, or there is a medium between the output end of the first 3D optical waveguide 113 and the input end of the single-mode optical fiber 14.

In a specific implementation of this embodiment of the present disclosure, the second lens 115 is a hemispheroid, or the second lens 115 is hemispherical. In addition, a hemispherical surface of the second lens 115 faces the end surface of the output end of the first 3D optical waveguide 113, and the other surface of the second lens 115 faces the end surface of the input end of the single-mode optical fiber 14. Moreover, the surfaces of the second lens 115 are substantially smooth.

If the output end of the first 3D optical waveguide 113 and the input end of the single-mode optical fiber 14 are separate from each other, and there is no second lens 115, after the first single-mode optical signal that has been focused for the first time is output from the output end of the first 3D optical waveguide 113, serious divergence occurs in transmission in a medium between the output end of the first 3D optical waveguide 113 and the input end of the single-mode optical fiber 14. Consequently, only a small part of the first single-mode optical signal that has been focused for the first time can enter the input end of the single-mode optical fiber 14. In the foregoing specific implementation of this embodiment of the present disclosure, the second lens 115 is used to focus the first single-mode optical signal that has been focused for the first time for the second time, and the focal point at which the focusing is performed for the second time coincides with the input end of the single-mode optical fiber 14 such that a loss caused when the first single-mode optical signal that has been focused for the first time enters the input end of the single-mode optical fiber 14 from the output end of the first 3D optical waveguide 113 can be reduced.

Figure 2C:
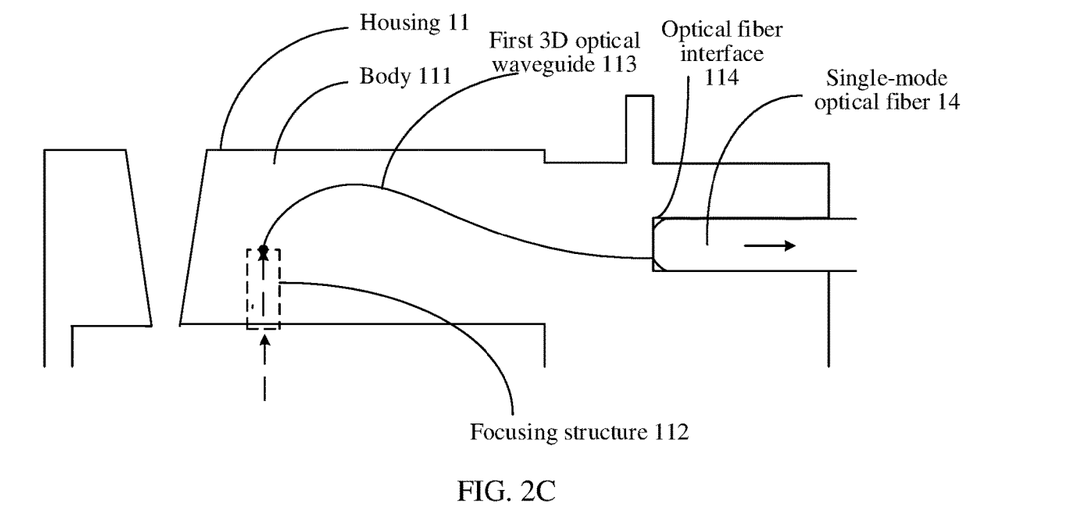
FIG. 2C is a schematic structural diagram of still another housing for packaging an optical transmitter module according to an embodiment of the present disclosure.

FIG. 2C provides still another embodiment of the housing 11. Different from the embodiment of the housing 11 shown in FIG. 2A, in the embodiment of the housing 11 shown in FIG. 2C, a diameter of the output end of the first 3D optical waveguide 113 is less than or equal to a diameter of the input end of the single-mode optical fiber 14, and the output end of the first 3D optical waveguide 113 is connected to the input end of the single-mode optical fiber 14. It should be noted that if the diameter of the output end of the first 3D optical waveguide 113 is less than the diameter of the input end of the single-mode optical fiber 14, the end surface of the output end of the first 3D optical waveguide 113 is completely connected or seamlessly connected to a part of the end surface of the input end of the single-mode optical fiber 14. If the diameter of the output end of the first 3D optical waveguide 113 is equal to the diameter of the input end of the single-mode optical fiber 14, the end surface of the output end of the first 3D optical waveguide 113 is completely connected or seamlessly connected to the end surface of the input end of the single-mode optical fiber 14. It should be noted that the part of the end surface of the input end of the single-mode optical fiber 14 that is connected to the end surface of the output end of the first 3D optical waveguide 113 and the end surface of the output end of the first 3D optical waveguide 113 are either planar or curved, and the two curved surfaces can be seamlessly connected.

An effect of such an implementation is as follows. The first single-mode optical signal that has been focused for the first time is transmitted from the output end of the first 3D optical waveguide 113 to the input end of the single-mode optical fiber 14 without passing through any other medium, thereby reducing a loss caused during the transmission of the first single-mode optical signal that has been focused for the first time from the output end of the first 3D optical waveguide 113 to the input end of the single-mode optical fiber 14.

Figure 2D:
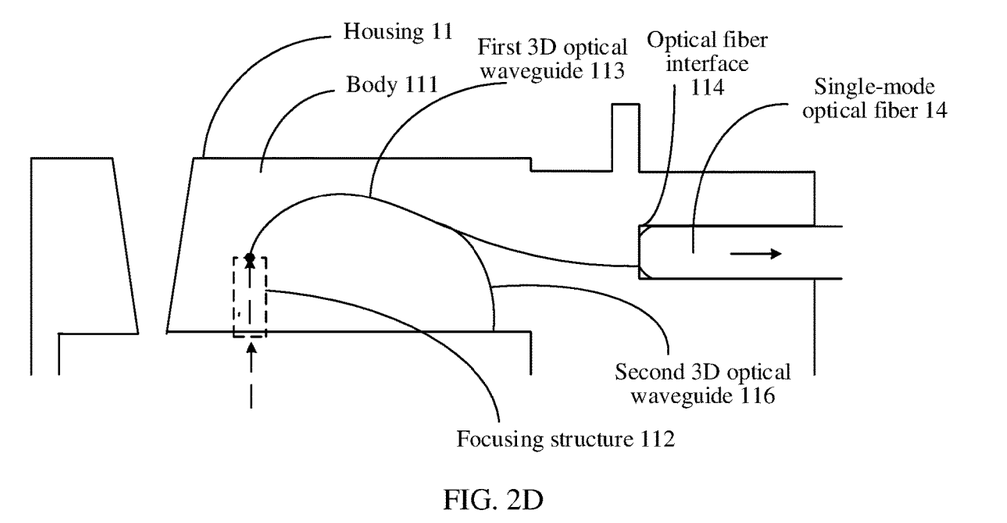
FIG. 2D is a schematic structural diagram of still another housing for packaging an optical transmitter module according to an embodiment of the present disclosure.

FIG. 2D provides still another embodiment of the housing 11. Different from the embodiment of the housing 11 shown in FIG. 2A, FIG. 2B, or FIG. 2C, in the embodiment of the housing 11 shown in FIG. 2D, the housing 11 further includes a second 3D optical waveguide 116. As shown in FIG. 2D, the housing 11 further includes the second 3D optical waveguide 116. The second 3D optical waveguide 116 is located inside the body 111. The second 3D optical waveguide 116 is configured to couple, through evanescent wave coupling, a second single-mode optical signal from the first single-mode optical signal that has been focused for the first time and that is transmitted in the first 3D optical waveguide 113 to perform backlight detection using the second single-mode optical signal. The second single-mode optical signal is a part of the first single-mode optical signal that has been focused for the first time.

During specific implementation of the performing backlight detection using the second single-mode optical signal, the second single-mode optical signal may be input into a monitor photodiode (MPD) through an output end of the second 3D optical waveguide 116, to perform backlight detection.

For a material that can be used by the second 3D optical waveguide 116 in the housing 11 provided in this embodiment of the present disclosure, refer to the material that can be used by the first 3D optical waveguide 113 in the housing 11 shown in FIG. 2A. Details are not described herein again.

It should be noted that energy of the second single-mode optical signal is 5% to 10% of energy of the first single-mode optical signal that has been focused for the first time.

It should be noted that inside the body 111, a smaller bending radius of the second 3D optical waveguide 116 indicates a higher optical loss. To make a bending loss of the second 3D optical waveguide 116 as low as possible, a difference between a reflective index of the material used by the second 3D optical waveguide 116 and a reflective index of the material used by the body 111 should be set as large as possible. Optionally, the difference between the reflective index of the material used by the second 3D optical waveguide 116 and the reflective index of the material used by the body 111 is $\Delta n \geq 0.02$, the bending radius of the second 3D optical waveguide 116 falls within a range from 500 μm to 800 μm, and the bending radius of the second 3D optical waveguide 116 may be 500 μm or 800 μm.

In this embodiment of the present disclosure, the second single-mode optical signal is coupled using the second 3D optical waveguide 116 and an evanescent wave coupling principle. Compared with the other approaches, an effect of such an implementation is to provide a solution of light splitting in a single-mode optical signal. The solution is used in the housing 11 for packaging an optical transmitter module to perform backlight detection.

It should be noted that the second 3D optical waveguide 116 includes an optical coupling portion and an optical transmission portion. The optical coupling portion is parallel to a coupled waveguide segment of the first 3D optical waveguide 113. An output end of the optical transmission portion is perpendicular to the bottom surface of the body 111. The optical coupling portion is configured to couple, through evanescent wave coupling, the second single-mode optical signal from the coupled waveguide segment, and transmit the second single-mode optical signal to the optical transmission portion. The optical transmission portion is configured to transmit the second single-mode optical signal to an outer side of the body 111 to perform backlight detection using the second single-mode optical signal.

It should be noted that a spacing between the optical coupling portion and the coupled waveguide segment falls within an interval [50 nm, 3 μm]. The interval [50 nm, 3 μm] is a closed interval. The spacing between the optical coupling portion and the coupled waveguide segment may be either of two endpoint values of the closed interval. That is, the spacing between the optical coupling portion and the coupled waveguide segment may be 50 nm or 3 μm. It should be noted that the intervals denoted with square brackets "[ ]" are all closed intervals, and two endpoint values of a closed interval are also available. This is true for all square brackets in this specification. Details are not described herein again. Optionally, a spacing between the coupled waveguide segment and the first subwaveguide is 1 μm.

Figure 3:
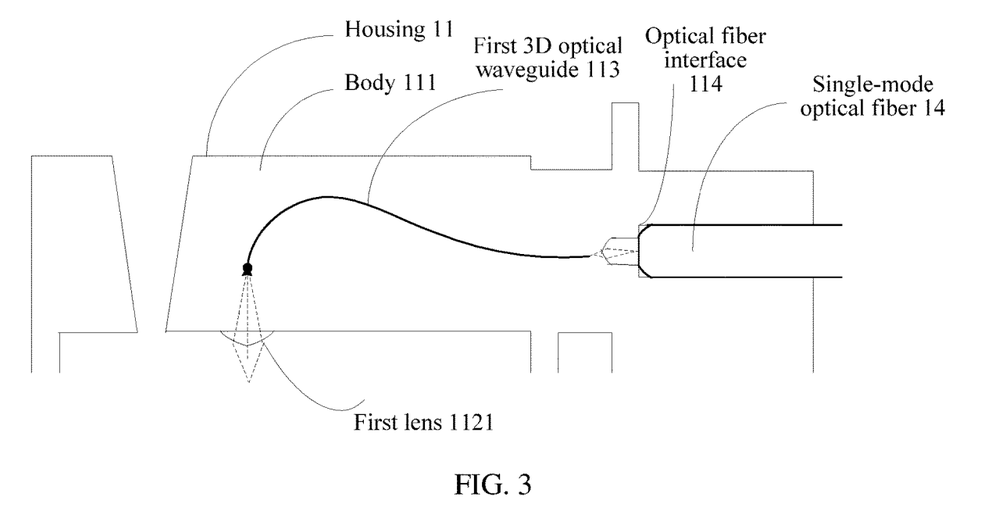
FIG. 3 is a schematic structural diagram of still another housing for packaging an optical transmitter module according to an embodiment of the present disclosure.

FIG. 3 provides an embodiment of the focusing structure 112 in the housing 11. The focusing structure 112 is applicable to one or more embodiments of the housing 11 according to the present disclosure. Referring to FIG. 3, the focusing structure 112 is a first lens 1121 in a hemispherical shape, the focal point of the focusing structure 112 is a focal point of the first lens 1121. A hemispherical surface of the first lens 1121 is exposed at an outer side of a bottom of the body 111, the other surface of the first lens 1121 faces an inner side of the body 111, and a position fit relationship between the first lens 1121 and the single-mode laser enables a center of a light-emitting surface of the single-mode laser to be in a straight line of an optical axis of the first lens.

It should be noted that the first lens 1121 may be entirely located outside the body 111, or may be partially embedded in the body 111.

It should be noted that a diameter of the first lens 1121 falls within an interval [130 μm, 3 mm], and a minimum distance between the hemispherical surface of the first lens 1121 and the light-emitting surface of the single-mode laser is greater than or equal to 10 μm. Optionally, a diameter of the first lens 1121 falls within an interval [130 μm, 250 μm], and a minimum distance between the hemispherical surface of the first lens 1121 and the light-emitting surface of the single-mode laser 13 is greater than or equal to 10 μm. Alternatively, optionally, a diameter of the first lens 1121 falls within an interval [130 μm, 3 mm], a minimum distance between the hemispherical surface of the first lens 1121 and the light-emitting surface of the single-mode laser 13 is greater than or equal to 100 μm, and a maximum distance between the hemispherical surface of the first lens 1121 and the light-emitting surface of the single-mode laser 13 is less than 3 mm. If the spacing between the hemispherical surface of the first lens 1121 and the light-emitting surface of the single-mode laser, and the diameter of the first lens 1121 meet the foregoing requirements, a distance between the focal point of the first lens 1121 and the bottom surface of the body 111 is greater than or equal to 900 μm.

It should be learned that, that the first lens 1121 is hemispherical means that the first lens 1121 is substantially hemispherical. A measurement criterion for being substantially hemispherical should be subject to an understanding of a person skilled in the art. This cannot be rigidly construed literally herein. Substantially is to be mentioned a plurality of times below, should be subject to an understanding of a person skilled in the art, and cannot be rigidly construed literally.

In a specific implementation of this embodiment of the present disclosure, the hemispherical surface of the first lens 1121 is substantially smooth. It should be noted that the other surface of the first lens 1121 that faces the inner side of the body 111 is also usually considered as an opening face of the first lens 1121. Optionally, the other surface of the first lens 1121 is also substantially smooth.

It should be noted that if the housing shown in FIG. 3 is applied to the optical transmitter module 10 shown in FIG. 1, the hemispherical surface of the first lens 1121 faces the light-emitting surface of the single-mode laser 13. That "the center of the light-emitting surface of the single-mode laser is in the straight line of the optical axis of the first lens" mentioned above means that the center of the light-emitting surface of the single-mode laser 13 is substantially located in the straight line of the optical axis of the first lens 1121 such that an energy loss is the lowest when the first single-mode optical signal that is focused using the first lens 1121 passes through the first lens 1121.

Because the first lens 1121 has favorable focusing performance, if the first lens is used for focusing, an optical signal passing through the first lens 1121 has a relatively low loss and is relatively rapidly focused. Therefore, in a first specific implementation of this embodiment of the present disclosure, use of the first lens 1121 to focus the first single-mode optical signal can reduce a loss of the first single-mode optical signal passing through the first lens 1121, and enable the first single-mode optical signal to be focused after only a short transmission distance after passing through the first lens 1121.

Figure 4:
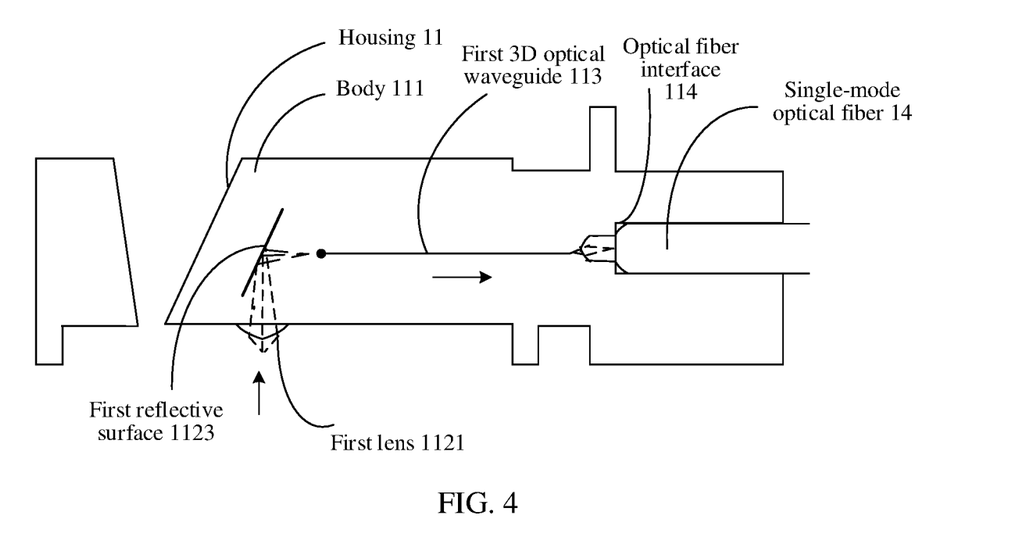
FIG. 4 is a schematic structural diagram of still another housing for packaging an optical transmitter module according to an embodiment of the present disclosure.

FIG. 4 provides another embodiment of the focusing structure 112 in the housing 11. The focusing structure 112 is applicable to one or more embodiments of the housing 11 according to the present disclosure. Referring to FIG. 4, the focusing structure 112 includes a first lens 1121 in a hemispherical shape and a first reflective surface 1123. A hemispherical surface of the first lens 1121 is exposed at an outer side of a bottom of the body 111. The other surface of the first lens 1121 faces an inner side of the body 111. A position fit relationship between the first lens 1121 and the single-mode laser enables a center of a light-emitting surface of the single-mode laser to be in a straight line of an optical axis of the first lens. The first reflective surface 1123 is located inside the body 111. The first lens 1121 is configured to receive a first single-mode optical signal transmitted by the single-mode laser, and transmit the received first single-mode optical signal to the first reflective surface 1123. The first reflective surface 1123 is configured to reflect the first single-mode optical signal transmitted by the first lens 1121, and enable the reflected first single-mode optical signal to be focused for the first time at a focal point of the first lens 1121 about a symmetry point of the first reflective surface 1123.

It should be noted that in a second specific implementation of this embodiment of the present disclosure, for all rules related to the first lens 1121, refer to related rules in the first specific implementation of this embodiment of the present disclosure. Details are not described herein again.

It should be noted that the first reflective surface 1123 is located inside the body 111. Optionally, the first reflective surface 1123 is located on an inner side surface of the body 111, and this is further implemented by gluing a transmit mirror to the inner side surface of the body 111. Alternatively, the inner side surface of the body 111 is coated with a material to form the first reflective surface 1123. It should be noted that the first reflective surface 1123 may be a complete reflective surface, and the first reflective surface 1123 may be further coated with a reflection enhancing coating for enhancing a capability of the first reflective surface 1123 to reflect the first single-mode optical signal.

Optionally, in a second specific implementation of this embodiment of the present disclosure, from the input end of the first 3D optical waveguide 113 to the output end of the first 3D optical waveguide 113, the first 3D optical waveguide 113 extends in a straight line direction, and the input end of the single-mode optical fiber 14 is located in an extension direction of (as shown in FIG. 4) of the first 3D optical waveguide 113. It should be noted that the extension direction of the first 3D optical waveguide 113 may alternatively be curved, provided that the input end of the first 3D optical waveguide 113 coincides with the focal point of the first lens 1121 about the symmetry point of the first reflective surface 1123, and the output end of the first 3D optical waveguide 113 can output the first single-mode optical signal that has been focused for the first time to the single-mode optical fiber 14.

It should be noted that a reflective surface has a function of changing a light propagation direction. In the second specific implementation of this embodiment of the present disclosure, the first reflective surface 1123 is configured to change a propagation direction of the first single-mode optical signal transmitted from the first lens 1121. If the bending radius of the first 3D optical waveguide 113 is limited by a material and a structure of the first 3D optical waveguide 113, use of the first reflective surface 1123 helps to implement miniaturization of the housing 11.

Figure 5A:
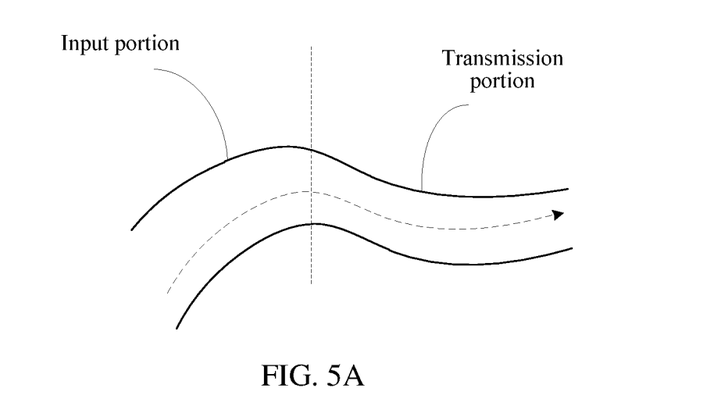
FIG. 5A is an enlarged partial view of a first 3D optical waveguide in FIG. 2A.

FIG. 5A provides an embodiment of the first 3D optical waveguide 113 in the housing 11. The first 3D optical waveguide 113 is applicable to one or more embodiments of the housing 11 according to the present disclosure. Using the embodiment of the housing 11 shown in FIG. 2A as an example, FIG. 5A may be used as an enlarged partial view of the first 3D optical waveguide 113 in FIG. 2A. Optionally, the first 3D optical waveguide 113 includes an input portion and a transmission portion, an input end of the input portion is the input end of the first 3D optical waveguide 113, and an output end of the transmission portion is the output end of the first 3D optical waveguide 113. The input portion is configured to receive, from the input end of the input portion, the first single-mode optical signal that has been focused for the first time, and transmit the first single-mode optical signal that has been focused for the first time to the transmission portion. The transmission portion is configured to receive the first single-mode optical signal that has been focused for the first time, and output, from the output end of the transmission portion, the first single-mode optical signal that has been focused for the first time to the single-mode optical fiber. A diameter of the input portion decreases evenly in a transmission direction of the first single-mode optical signal that has been focused for the first time 1 in the input portion, and a minimum diameter of the input portion is the same as a diameter of the transmission portion.

A length of the input portion is greater than or equal to 50 µm, a diameter of the input end of the input portion falls within an interval [9 µm, 50 µm], and the minimum diameter of the input portion and the diameter of the transmission portion fall within an interval [200 nm, 10 µm]. Optionally, a diameter of the input end of the input portion falls within an interval [9 µm, 20 µm], and the minimum diameter of the input portion and the diameter of the transmission portion fall within an interval [3 nm, 9 µm].

It should be noted that the diameter of the input portion decreases evenly, and may decrease in an equidifferent manner, or may decrease exponentially. An objective of specifying the diameter decreasing evenly is to reduce a loss of the first single-mode optical signal that has been focused for the first time and that is transmitted in the input portion.

It should be noted that the input portion and the transmission portion may be integrally formed, that is, the input portion and the transmission portion are different parts of a same 3D optical waveguide. Alternatively, the input portion and the transmission portion may be two independent 3D optical subwaveguides, the input portion is a first subwaveguide, the transmission portion is a second subwaveguide, and an output end of the input portion is connected to an input end of the transmission portion.

It can be learned from the foregoing descriptions that in the entire first 3D optical waveguide, the diameter of the input end of the input portion is the largest, and the first single-mode optical signal that has been focused for the first time enters the input portion from the input end to the input portion. The diameter of the input end of the input portion is set relatively large, helping the first single-mode optical signal that has been focused for the first time enter the input portion relatively easily, and causing the first single-mode optical signal that enters the input portion to have a smaller loss than the first single-mode optical signal that has been focused for the first time. Therefore, the diameter of the input end of the input portion is set greater than the diameter of the transmission portion, and this helps to improve tolerance performance of the housing for an optical transmitter module.

Figure 5B:
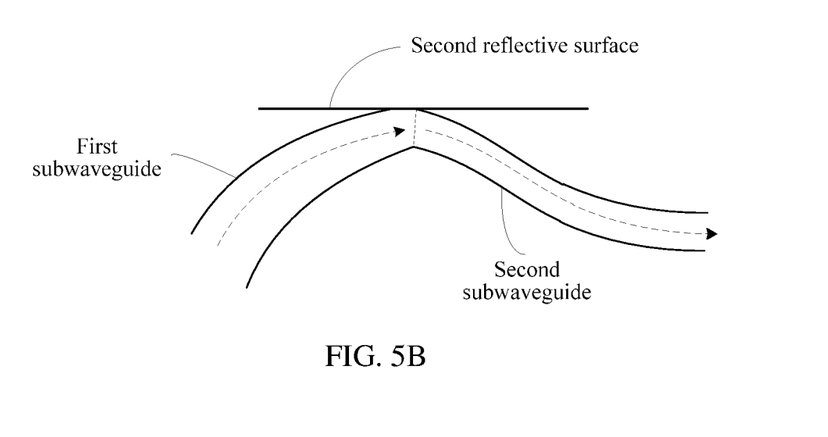
FIG. 5B is an enlarged partial view of the first 3D optical waveguide in FIG. 2A.

With reference to FIG. 5B, during specific implementation of the first 3D optical waveguide 113 shown in FIG. 5A, the input portion and the transmission portion may be two independent subwaveguides, the input portion is a first subwaveguide, the transmission portion is a second subwaveguide, and the housing 11 further includes a second reflective surface. Further, the second reflective surface is located inside the body 111, an output end of the input portion and an input end of the transmission portion are both in contact with the second reflective surface. The second reflective surface is configured to receive the first single-mode optical signal that has been focused for the first time and that is transmitted by the first subwaveguide, and transmit the first single-mode optical signal that has been focused for the first time to the second subwaveguide.

It is easily learned that a reflective surface can change a light transmission direction, and if the input portion and the transmission portion are two independent subwaveguides, and the second reflective surface is added to the inside of the housing 11, a transmission direction of the first single-mode optical signal that has been focused for the first time and that is output from the first subwaveguide is changed to implement transmission of the first single-mode optical signal that has been focused for the first time to the second subwaveguide, avoiding disadvantages of requiring a relatively long 3D optical waveguide and occupying of relatively large space by the relatively long 3D optical waveguide when a transmission direction of a single-mode optical signal needs to be changed using a bending 3D optical waveguide, thereby helping to implement miniaturization of the housing for packaging an optical transmitter module.

In a specific implementation of this embodiment of the present disclosure, from the input end of the first subwaveguide to the output end of the first subwaveguide, the first subwaveguide extends along a straight line. In another specific implementation of this embodiment of the present disclosure, from the input end of the second subwaveguide to the output end of the second subwaveguide, the second subwaveguide extends along a straight line.

It should be noted that related descriptions of the first reflective surface 1123 in this application are applicable to the second reflective surface, and details are not described herein again.

The descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A housing for packaging an optical transmitter module, comprising:
    a body;
    a focusing structure coupled to the body and configured to:
        receive a first single-mode optical signal from a single-mode laser; and
        enable the first single-mode optical signal to be focused for a first time at a focal point of the focusing structure to obtain a first focused single-mode optical signal;
    a first three-dimensional (3D) optical waveguide embedded in the body and comprising:
        an input portion comprising a first subwaveguide comprising a first input end and a first output end, wherein the first input end coincides with the focal point of the focusing structure, and wherein the first input end is configured to receive the first focused single-mode optical signal; and
        a transmission portion comprising a second subwaveguide comprising a second input end and a second output end, wherein the second input end is directly coupled to the first output end such that the input portion is directly coupled to the transmission portion, and wherein the second output end is configured to transmit the first focused single-mode optical signal;
    a first reflective surface located inside the body, wherein the first output end and the second input end are both coupled to the first reflective surface; and
    an optical fiber interface located inside the body and configured to accommodate a single-mode optical fiber, wherein the second output end is configured to send the first focused single-mode optical signal to the single-mode optical fiber.

2. The housing of claim 1, wherein a bending radius of the first 3D optical waveguide is greater than 500 micrometers (μm).

3. The housing of claim 1, wherein a bending radius of the first 3D optical waveguide is equal to 500 micrometers (μm).

4. The housing of claim 1, wherein the first single-mode optical signal is transmitted from a bottom surface of the body to the focal point of the focusing structure, and wherein an optical path of a transmission is greater than 900 micrometers (μm).

5. The housing of claim 1, wherein the first single-mode optical signal is transmitted from a bottom surface of the body to the focal point of the focusing structure, and wherein an optical path of a transmission is equal to 900 micrometers (μm).

6. The housing of claim 1, wherein the focusing structure comprises a first lens in a hemispherical shape, wherein the focal point of the focusing structure comprises a focal point of the first lens, wherein a hemispherical surface of the first lens is exposed at an outer side of a bottom of the body, wherein another surface of the first lens faces an inner side of the body, and wherein a position fit relationship between the first lens and the single-mode laser enables a center of a light-emitting surface of the single-mode laser to be in a straight line of an optical axis of the first lens.

7. The housing of claim 1, wherein the focusing structure comprises a first lens in a hemispherical shape and a second reflective surface, wherein a hemispherical surface of the first lens is exposed at an outer side of a bottom of the body, wherein another surface of the first lens faces an inner side of the body, wherein a position fit relationship between the first lens and the single-mode laser enables a center of a light-emitting surface of the single-mode laser to be in a straight line of an optical axis of the first lens, wherein the second reflective surface is located inside the body, and wherein the first lens is configured to:
    receive the first single-mode optical signal from the single-mode laser; and
    transmit the first single-mode optical signal to the second reflective surface, and
    wherein the second reflective surface is configured to:
        reflect the first single-mode optical signal received from the first lens to obtain a reflected first single-mode optical signal; and
        enable the reflected first single-mode optical signal to be focused for the first time at the focal point of the focusing structure, wherein the focal point of the focusing structure comprises a symmetry point of a focal point of the first lens about the second reflective surface.

8. The housing of claim 1, wherein the input portion is configured to transmit the first focused single-mode optical signal to the transmission portion, wherein the transmission portion is configured to:
    receive the first focused single-mode optical signal; and
    output, from the second output end of the transmission portion, the first focused single-mode optical signal to the single-mode optical fiber, wherein a diameter of the input portion decreases evenly in a transmission direction of an optical signal in the input portion, and wherein a minimum diameter of the input portion is the same as a diameter of the transmission portion.

9. The housing of claim 8, wherein a length of the input portion is greater than 50 micrometers (μm), wherein a diameter of the first input end of the input portion is either 9 μm or 50 μm, and wherein the minimum diameter of the input portion and the diameter of the transmission portion is either 200 nanometers (nm) or 10 μm.

10. The housing of claim 8, wherein a length of the input portion is equal to 50 micrometers (μm), wherein a diameter of the first input end of the input portion is either 9 μm or 50 μm, and wherein the minimum diameter of the input portion and the diameter of the transmission portion is either 200 nanometers (nm) or 10 μm.

11. The housing of claim 8, wherein the first subwaveguide and the second subwaveguide are two independent subwaveguides, and wherein the first reflective surface is configured to:
   receive the first focused single-mode optical signal from the first subwaveguide; and
   transmit the first focused single-mode optical signal to the second subwaveguide.

12. The housing of claim 6, wherein a diameter of the first lens falls within an interval [130 micrometers (μm), 3 millimeters (mm)], and wherein a minimum distance between the hemispherical surface of the first lens and the light-emitting surface of the single-mode laser is greater than 10 μm.

13. The housing of claim 6, wherein a diameter of the first lens falls within an interval [130 micrometers (μm), 3 millimeters (mm)], and wherein a minimum distance between the hemispherical surface of the first lens and the light-emitting surface of the single-mode laser is equal to 10 μm.

14. The housing of claim 12, wherein a distance between the focal point of the first lens and a bottom surface of the body is greater than 900 μm.

15. The housing of claim 12, wherein a distance between the focal point of the first lens and a bottom surface of the body is equal to 900 μm.

16. The housing of claim 13, wherein a distance between the focal point of the first lens and a bottom surface of the body is greater than 900 μm.

17. The housing of claim 13, wherein a distance between the focal point of the first lens and a bottom surface of the body is equal to 900 μm.

18. The housing of claim 1, wherein the housing further comprises a second lens located between the second output end and an input end of the single-mode optical fiber when the second output end of the first 3D optical waveguide and the input end of the single-mode optical fiber are separate from each other, and wherein the second lens is configured to:
   receive the first focused single-mode optical signal output from the second output end of the first 3D optical waveguide;
   enable the first focused single-mode optical signal to be focused for a second time at a focal point of the second lens to obtain a second focused single-mode optical signal; and
   output the second focused single-mode optical signal to the single-mode optical fiber, wherein the focal point of the second lens coincides with the input end of the single-mode optical fiber.

19. The housing of claim 1, further comprising a second 3D optical waveguide located inside the body, wherein the second 3D optical waveguide is configured to:
   couple, through evanescent wave coupling, a second single-mode optical signal from the first focused single-mode optical signal; and
   perform backlight detection using the second single-mode optical signal, wherein the second single-mode optical signal comprises a part of the first focused single-mode optical signal.

20. An optical transmitter module, comprising:
a substrate;
a single-mode laser fixed to an upper surface of the substrate and configured to transmit a first single-mode optical signal;
a single-mode optical fiber coupled to the single-mode laser; and
a housing fixed to the upper surface of the substrate and comprising:
   a body;
   a focusing structure coupled to the body, wherein the focusing structure comprises a first lens comprising a hemispherical surface configured to:
      receive the first single-mode optical signal from the single-mode laser; and
      enable the first single-mode optical signal to be focused for a first time at a focal point of the focusing structure to obtain a first focused single-mode optical signal;
   a first three-dimensional (3D) optical waveguide embedded in the body and comprising:
      an input portion comprising a first subwaveguide comprising a first input end and a first output end, wherein the first input end coincides with the focal point of the focusing structure, and wherein the first input end is configured to receive the first focused single-mode optical signal; and
      a transmission portion comprising a second subwaveguide comprising a second input end and a second output end, wherein the second input end is directly coupled to the first output end such that the input portion is directly coupled to the transmission portion, wherein the second output end is configured to transmit the first focused single-mode optical signal; and wherein the first 3D) optical waveguide is configured to:
         receive, from the first input end the first focused single-mode optical; and
         output, from the second output end, the first focused single-mode optical signal to the single-mode optical fiber;
   a first reflective surface located inside the body, wherein the first output end and the second input end are both coupled to the first reflective surface; and
   an optical fiber interface located inside the body and configured to accommodate the single-mode optical fiber, wherein the single-mode laser is located in a cavity enclosed by the housing and the upper surface of the substrate.

* * * * *

UNITED STATES PATENT AND TRADEMARK OFFICE
CERTIFICATE OF CORRECTION

PATENT NO. : 10,545,286 B2  
APPLICATION NO. : 16/020366  
DATED : January 28, 2020  
INVENTOR(S) : Min Sun et al.

Page 1 of 1

It is certified that error appears in the above-identified patent and that said Letters Patent is hereby corrected as shown below:

On the Title Page

Foreign Application Priority Data: "2015 1 1004829" should read "2015 1 1004829.X"

In the Claims

Claim 20, Column 18, Line 39: "first 3D)" should read "first 3D"

Signed and Sealed this  
Tenth Day of March, 2020

Andrei Iancu  
*Director of the United States Patent and Trademark Office*